Patented May 11, 1943

2,318,641

UNITED STATES PATENT OFFICE 2,318,641

FERMENTATION PROCESS FOR THE PRODUCTION OF 5-KETOGLUCONIC ACID

Joseph J. Stubbs, Washington, D. C., and Lewis B. Lockwood, Alexandria, and Edward T. Roe and George E. Ward, Arlington, Va., assignors to Henry A. Wallace, as Secretary of Agriculture of the United States of America, and his successors in office No Drawing. Application July 8, 1940,
Serial No. 344,381

4 Claims. (Cl. 195—47)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a method for the preparation of ketocarboxylic acids, and more particularly to a method for the preparation, by fermentation, of 5-ketogluconic acid from glucose, having value as a starting material for the preparation of tartaric acid. (Barch, J. Am. Chem. Soc., vol. 55, page 3653 (1933); and also Pasternack and Brown, U. S. Patent No. 2,197,021 (1940)).

The formation of 5-ketogluconic acid from glucose by bacteria was first reported by Boutroux (Ann. Inst. Pasteur 2, 308 (1887), Compte rend. 102, 924 (1886), 111, 185 (1890), 127, 1224 (1898)). Since that time numerous workers, including Bernhauer et al. (Biochem. Z. 280, 360, 367 (1935), Z. physiol. Chem. 180, 232 (1929)), Hermann et al. (Biochem. Z. 205, 297 (1929), 214, 357 (1929), 233, 129 (1929), Kluyver et al. (Rec. trav. chim. 57 (6) 609 (1938), Tijdschr. Vergelijk. Geneeskunde 10, 170 (1924), have obtained this acid by the action of various species of acetic acid bacteria on nutrient solutions containing, glucose or gluconate salts. In these cases the bacteria have been cultivated in unagitated surface cultures, using a relatively shallow layer of solution, and the time required to convert the substrate to 5-ketogluconic acid has been twenty days, or more.

While bacteria of the genus Acetobacter have been studied for many years, as indicated above, it was not known that they would produce 5-ketogluconic acid when cultivated in a submerged state.

In contrast to the prior art, we have found that when bacteria of the genus Acetobacter are cultivated in a submerged state in nutrient solutions containing glucose or gluconate salts, and if the system is aerated with gases containing oxygen, such as air, at atmospheric or superatmospheric pressure, the system at the same time being agitated by various means, a rapid and efficient conversion of the substrate to 5-ketogluconic acid occurs. In contrast to previously described procedures requiring 20 days or more for completion of the fermentation, it is possible, by applying the technique of our invention, to obtain good yields of 5-ketogluconic acid in 30 to 50 hours.

In our invention, agitation of the system may be effected by blowing air through the mass, or by propellers, or by revolving the fermenter or by other means which will occur to those skilled in the art. The exact apparatus used to effect agitation is not critical, the important factor being the intimate contacting of the bacterial cells, the substrate, the neutralizing agent, and the gas used for aeration.

We have found that aeration of the mash is necessary to obtain a rapid oxidation of the substrate to 5-ketogluconic acid. Such aeration may be applied at atmospheric pressure or at superatmospheric pressure.

We have found it desirable to conduct our fermentation at temperatures between 20° C. and 40° C., the range from 25° C. to 30° C. being especially suitable.

As typical apparatus within which our process may be successfully conducted, we cite the Jena glass gas-washing bottles (type 101a) used by May, Herrick, Moyer and Wells for the production of gluconic acid by mold fermentation (Ind. Eng. Chem. 26, 575 (1934)); the rotary aluminum fermenters developed by Herrick, Hellbach and May for the industrial application of submerged mold fermentations (Ind. Eng. Chem. 27, 681 (1935)), and vertical vat fermenters in common use in the art. We do not wish to restrict our invention as to the equipment that may be used, since numerous modifications and adaptations are possible, and will be readily apparent to those skilled in the art.

Considerable latitude is possible in the selection of nutrients to be used in performing our invention. While we may use corn steeping liquor, as disclosed hereafter in Example 1, we may also replace this material with other nutrients, such as organic nitrogenous compounds (urea, amino acids), or we may use inorganic ammonium salts (ammonium sulfate, ammonium phosphate). We find it desirable to also provide small quantities of magnesium sulfate and potassium phosphate, which are recognized essential nutrients, when our invention is practiced without the use of corn steeping liquor.

We do not wish to be restricted as to nutrient components, since many variations will be apparent to those skilled in the art. Likewise, we do not wish to be restricted as to the use of calcium carbonate as the neutralizing agent, since the substitution of quicklime, zinc carbonate, and other similar substances, will readily occur to those skilled in the art.

The following examples illustrate representative procedures used in practicing our invention:

Example 1

An aqueous fermentation medium of the following composition was used:

| | Grams per liter of medium |
|---|---|
| Glucose | 100 |
| Corn steeping liquor | 5 |
| Octadecyl alcohol | 0.3 |
| $CaCO_3$ | 27 |

3200 cc. of this sterile medium were innoculated with approximately 300 cc. of an active culture of Acetobacter and placed in a rotary drum fermenter. Air at atmospheric pressure was passed through the fermenter at a rate of 1600 cc. per minute, the solution was agitated by revolving the drum 13 revolutions per minute, and the temperature of the system was maintained at 25° C. The course of the fermentation was followed by periodic analysis. After 48 hours, the glucose had been converted to 5-ketogluconic acid (calcium salt), which was present in a quantity equivalent to an 83% yield, based on the glucose available. The product was identified by its optical properties (specific rotation $-14.8°$), its calcium content (Ca found: 8.51%, theoretical for $Ca(C_6H_9O_7)_2 \cdot 2\frac{1}{2}H_2O$: 8.50%), its limited solubility in water, and its reducing action toward alkaline copper solutions.

Example 2

The same conditions and materials were used as in Example 1, except that the process was conducted under increased air pressure, a gage pressure of 30 lbs. per square inch being maintained. After 37 hours the glucose had been converted to 5-ketogluconic acid (calcium salt), which was present in a quantity equivalent to a 90% yield, based on the glucose available.

Example 3

The same conditions and materials were used as in Example 2, except that calcium gluconate (120 grams per liter) was used as the substrate instead of glucose. After 48 hours, a 91% yield of 5-ketogluconic acid (calcium salt) was obtained.

Example 4

The same conditions and materials were used as in Example 2, except that sodium gluconate (100 grams per liter) was used as the substrate instead of glucose. After 66 hours, a 25% yield of 5-ketogluconic acid (calcium salt) was obtained.

Having thus described our invention, what we claim for Letters Patent is:

1. A process for the production of 5-ketogluconic acid, which comprises inoculating a glucose nutrient medium with bacteria of the genus Acetobacter; thence aerating and agitating the inoculated mass, the while cultivating the bacteria in a submerged state thereby producing 5-ketogluconic acid.

2. A process for the production of 5-ketogluconic acid, which comprises inoculating a glucose nutrient medium with bacteria of the genus Acetobacter; thence aerating and agitating the inoculated mass, the while maintaining the same under superatmospheric pressure of gases containing substantial quantities of oxygen, and cultivating the bacteria in a submerged state thereby producing 5-ketogluconic acid.

3. A process for the production of 5-ketogluconic acid, which comprises inoculating a nutrient solution containing a gluconate salt with bacteria of the genus Acetobacter; thence aerating and agitating the inoculated mass, the while cultivating the bacteria in a submerged state thereby producing 5-ketogluconic acid.

4. A process for the production of 5-ketogluconic acid, which comprises inoculating a nutrient solution containing a gluconate salt with bacteria of the genus Acetobacter; thence aerating and agitating the inoculated mass, the while maintaining the same under superatmospheric pressure of gases containing substantial quantities of oxygen, and cultivating the bacteria in a submerged state thereby producing 5-ketogluconic acid.

JOSEPH J. STUBBS.
LEWIS B. LOCKWOOD.
EDWARD T. ROE.
GEORGE E. WARD.